(12) United States Patent
Kim et al.

(10) Patent No.: US 9,409,260 B2
(45) Date of Patent: Aug. 9, 2016

(54) GUIDE FRAME SUPPORT DEVICE

(75) Inventors: Jong Jun Kim, Ulsan (KR); Jong Cheol Kim, Ulsan (KR); Hyeong Soon Moon, Ulsan (KR)

(73) Assignee: Hyundai Heavy Industries Co., Ltd., Dong-Gu, Ulsan (KR)

( * ) Notice: Subject to any disclaimer, the term of this patent is extended or adjusted under 35 U.S.C. 154(b) by 189 days.

(21) Appl. No.: 14/361,961

(22) PCT Filed: Jun. 15, 2012

(86) PCT No.: PCT/KR2012/004744
§ 371 (c)(1),
(2), (4) Date: Jul. 15, 2014

(87) PCT Pub. No.: WO2013/108967
PCT Pub. Date: Jul. 25, 2013

(65) Prior Publication Data
US 2015/0183064 A1      Jul. 2, 2015

(30) Foreign Application Priority Data

Jan. 18, 2012  (KR) ........................ 10-2012-0005625

(51) Int. Cl.
*B23K 1/00*        (2006.01)
*B23K 37/02*       (2006.01)
*B23K 37/053*      (2006.01)

(52) U.S. Cl.
CPC ......... *B23K 37/0276* (2013.01); *B23K 37/0217* (2013.01); *B23K 37/0533* (2013.01); *B23K 2201/10* (2013.01)

(58) Field of Classification Search
CPC .......... B23K 2201/10; B23K 37/0217; B23K 37/0276; B23K 37/0533; B23K 9/0286
USPC ............. 228/29, 45; 219/124.31; 266/56, 71
See application file for complete search history.

(56) References Cited

U.S. PATENT DOCUMENTS 3,910,480 A * 10/1975 Thatcher ................ B23K 7/006
                                                    219/60 A
4,177,913 A * 12/1979 Iwamoto ............ B23K 37/0217
                                                    219/124.31

(Continued)

FOREIGN PATENT DOCUMENTS

| CN | 101758349 A | 6/2010 |
| CN | 201603959 U | 10/2010 |

(Continued)

OTHER PUBLICATIONS

Extended European Search Report dated Oct. 26, 2015 for European Patent Application No. 12866238.4.

(Continued)

*Primary Examiner* — Devang R Patel
*Assistant Examiner* — Carlos Gamino
(74) *Attorney, Agent, or Firm* — Ladas & Parry, LLP

(57) ABSTRACT

Provided is a guide frame support device for a pipe welding device, the guide frame support device, which supports a guide frame provided on an outer circumferential surface of a pipe to be welded, including: a hinge bar connected to an inner circumferential surface of the guide frame; a pair of support bars which rotates around the hinge bar at a predetermined angle; hinge links, one side of each of which is hinge-connected to both ends of the hinge bar and the other side of each of which is connected to both ends of the pair of support bars; and a torsion spring provided between the pair of support bars and for providing elastic force to enable the support bars to rotate around the hinge bar at a predetermined angle.

4 Claims, 6 Drawing Sheets

(56) References Cited

U.S. PATENT DOCUMENTS

| | | | |
|---|---|---|---|
| 4,250,813 A * | 2/1981 | Slavens | B23K 37/00 |
| | | | 104/118 |
| 4,260,869 A * | 4/1981 | Slavens | B23K 37/0217 |
| | | | 104/119 |
| 4,331,278 A * | 5/1982 | Sherer | B23K 37/0276 |
| | | | 219/124.31 |
| 4,347,421 A | 8/1982 | Mukuda et al. | |
| 4,531,663 A * | 7/1985 | Kajiyama | G21C 17/007 |
| | | | 104/118 |
| 4,597,335 A * | 7/1986 | Slavens | B23K 9/0282 |
| | | | 104/118 |
| 4,726,300 A * | 2/1988 | Kazlauskas | E02D 5/285 |
| | | | 104/118 |
| 4,767,048 A * | 8/1988 | Kimbrough | B23K 37/0217 |
| | | | 104/165 |
| 5,165,160 A * | 11/1992 | Poncelet | B23K 37/0533 |
| | | | 228/49.3 |
| 5,227,601 A | 7/1993 | Black | |
| 5,490,714 A * | 2/1996 | de Santis | A47C 3/025 |
| | | | 248/576 |
| 5,910,258 A * | 6/1999 | Kazirskis | B23K 9/0286 |
| | | | 219/125.11 |
| 6,380,505 B1 * | 4/2002 | Stoops | B23K 37/0533 |
| | | | 219/125.11 |
| 7,398,909 B2 * | 7/2008 | Dick | B23K 37/0533 |
| | | | 228/44.5 |
| 7,540,401 B2 * | 6/2009 | Vermaat | B23K 37/0533 |
| | | | 228/212 |
| 8,481,882 B2 * | 7/2013 | Kastelein | B23K 5/24 |
| | | | 219/125.1 |
| 9,132,498 B2 * | 9/2015 | Miller | F16H 35/00 |
| 2008/0052892 A1 * | 3/2008 | Dwileski | B23K 37/0533 |
| | | | 29/464 |

FOREIGN PATENT DOCUMENTS

| | | |
|---|---|---|
| DE | 28 08 337 | 9/1978 |
| GB | 1 359 098 | 7/1974 |
| JP | 55-160290 U | 11/1980 |
| JP | 61-148492 U | 9/1986 |
| KR | 10-2004-0020987 A | 3/2004 |
| KR | 10-2007-0008778 A | 1/2007 |
| KR | 1020100136267 | 6/2009 |
| KR | 10-1077724 B1 | 10/2011 |

OTHER PUBLICATIONS

International Search Report for PCT/KR2012/004744 dated Dec. 3, 2012.

* cited by examiner

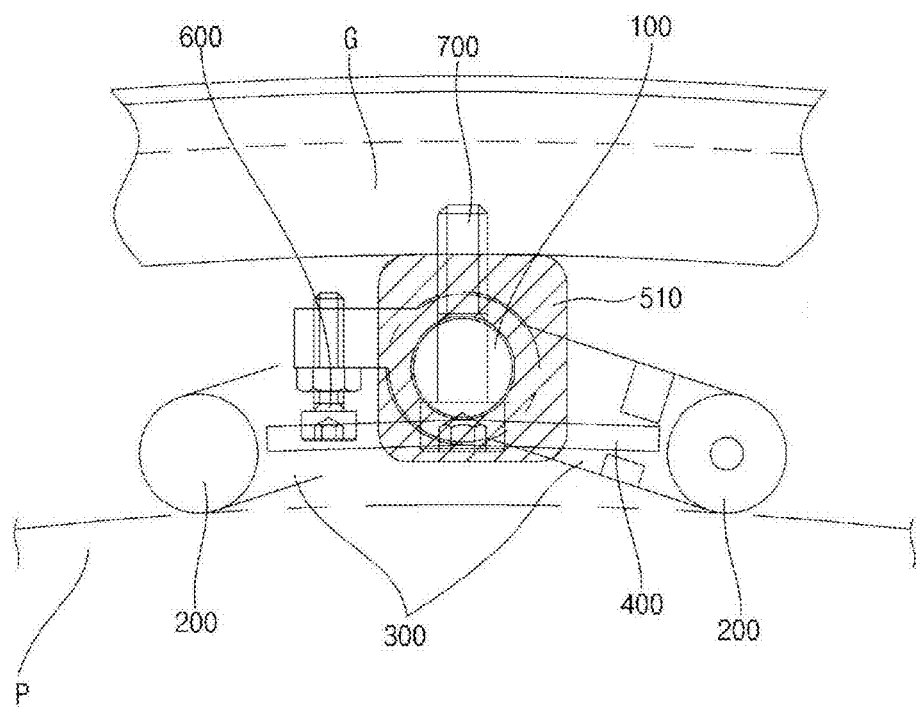

GUIDE FRAME SUPPORT DEVICE

CROSS-REFERENCE TO RELATED APPLICATIONS

This application is the U.S. national stage application of International Patent Application No. PCT/KR2012/004744, filed Jun. 15, 2012, which claims priority to Korean Application No. 10-2012-0005625, filed Jan. 18, 2012, the disclosures of each of which are incorporated herein by reference in their entirety.

TECHNICAL FIELD

The present invention relates to a guide frame support device, and more specifically, to a guide frame support device which enables pipe working efficiency to be improved.

BACKGROUND ART

In general, when a pipe is welded using a welding device, a guide frame in a circular shape is installed on an outer circumferential surface of the pipe, and a welding portion of the pipe is welded by the welding device which is rotated along the guide frame.

At this time, a separation distance between the guide frame and the outer circumferential surface of the pipe must be regular in order to perform accurate and rapid welding. The same is also applied to a case in which a cutting process, a machining process or the like of the pipe is performed using the welding device.

Accordingly, in order to regularly maintain the separation distance, as illustrated in FIG. 1, a guide frame support device 10 is installed between the guide frame G and the pipe at a regular distance.

The guide frame support device 10 may include: a fixed portion 11 fixed to the guide frame G; and a double plate-spring 12 which pressurizes the pipe.

However, in the guide frame support device 10, the separation distance between the pipe and the guide frame G should be manually adjusted one by one minutely.

When a slight error occurs upon adjusting the separation distance, a part of the multiple guide frame support devices 10 installed in a circumferential direction of the pipe may not come into contact with a surface of the pipe, or the pipe may be damaged by the guide frame support devices being excessively touched due to unskilled adjustment.

Also, when an external diameter of the pipe is changed in size, it is problematic in that a plurality of insert type plates for adjusting the separation distance must be inserted in order to reduce or extend the separation distance, and it is also problematic in that many guide frame support devices 10 must be attached in a circumferential direction of the guide frame G in order to maintain regular bearing power because an elastic limit of the double plate-spring is weak.

DISCLOSURE OF INVENTION

Technical Problem

The present invention has been made keeping in mind the above problems occurring in the prior art, and an object of the present invention is to provide a guide frame support device that can more accurately adjust a separation distance between a guide frame and a pipe and can adjust elasticity.

The technical problems to be solved by the present invention are not limited to the technical problems described above, and other technical problems can be clearly understood by those having ordinary skill in the art to which the present invention pertains based on the following contents.

Solution to Problem

In order to accomplish the above object, the present invention provides a guide frame support device for a pipe welding device, the guide frame support device, which supports a guide frame provided on an outer circumferential surface of a pipe to be welded, including: a hinge bar connected to an inner circumferential surface of the guide frame; a pair of support bars which rotates around the hinge bar at a predetermined angle; hinge links, one side of each of which is hinge-connected to both ends of the hinge bar and the other side of each of which is connected to both ends of the pair of support bars; and a torsion spring provided between the pair of support bars and for providing elastic force to enable the support bars to rotate around the hinge bar at a predetermined angle.

At this time, the guide frame support device may further include: a cam plate disposed at the hinge bar and rotating around the hinge bar; a fixing member for pressurizing and fixing the cam plate; and a separation distance adjusting device for adjusting a separation distance between the pipe and the guide frame.

Also, the guide frame support device may further include a stopper bolt passing through the hinge links, one side of which pressurizes the guide frame to adjust elasticity provided by the torsion spring.

Also, the cam plate may be formed in a polygonal shape in which distances from the center of rotation to ends are different from each other.

Advantageous Effects of Invention

According to the present invention, when there is a need to minutely adjust a separation distance between a guide frame and a pipe during a welding process, by using a torsion spring that can be easily adjusted by a worker and has strong elasticity compared to a plate spring, a guide frame support device can be installed in a lesser number of guide frame devices can be installed, and elasticity can be freely adjusted, thereby enabling the efficiency of a welding process to be improved.

BRIEF DESCRIPTION OF DRAWINGS

FIGS. 3 to 6 are cross-sectional views showing operations of the guide frame support device according to the embodiment of the present invention.

MODE FOR THE INVENTION

Figure 1:
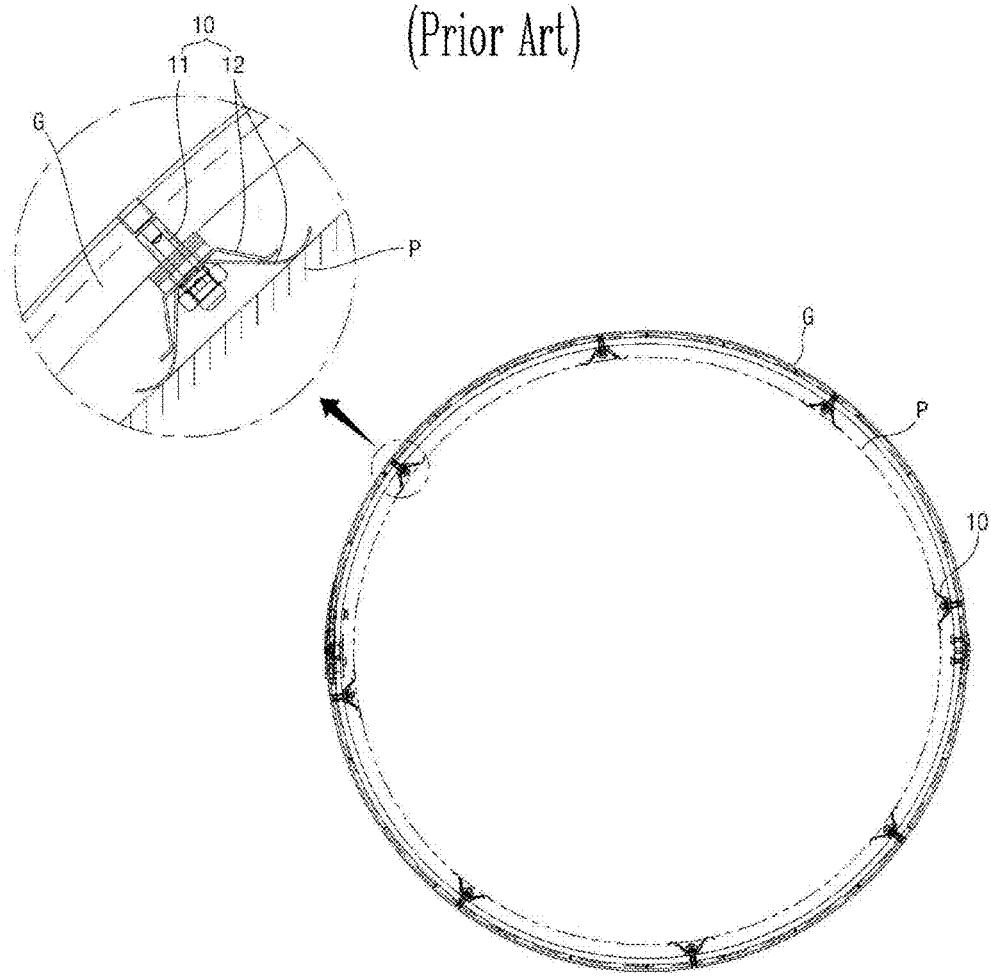
FIG. 1 is a cross-sectional view showing a conventional guide frame device in which a double plate-spring is used.

Hereinafter, embodiments of the present invention will be described in detail with reference to the accompanying drawings. It should be understood that a size or shape of the elements illustrated in the drawings may be exaggeratedly drawn to more clearly and conveniently explain the present invention. Furthermore, the terms specifically defined in consideration of the configuration and operation of the present invention may be changed depending on the intention or practice of a user and an operator. The terms should be defined based on all contents in the specification. The present invention may be embodied in different forms and should not be construed as limited to the embodiments set forth herein. Those having ordinary skill in the art who understand the present invention could easily embody different embodiments which belong to the scope of the present invention.

Figure 2:
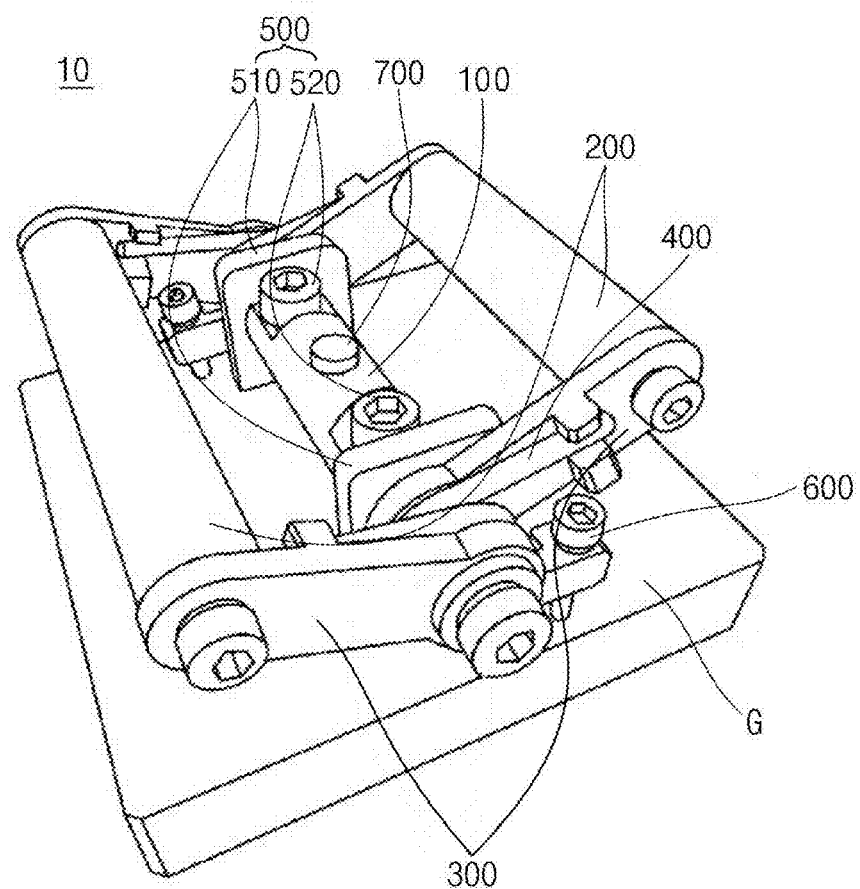
FIG. 2 is a perspective view showing a guide frame support device according to an embodiment of the present invention.

As illustrated in FIG. 2, a guide frame support device 10 according to an embodiment of the present invention includes: a hinge bar 100, a pair of support bars 200, hinge links 300, a torsion spring 400, a separation distance adjusting device 500, a stopper bolt 600, and a coupling member 700.

The hinge bar 100 is connected to an inner circumferential surface of the guide frame G.

The support bar 200 rotates around the hinge bar 100 at a predetermined angle.

One side of each of the hinge links 300 is hinge-connected to both ends of the hinge bar 100, and the other side of each of the hinge links is connected to both ends of the support bars 200.

The torsion spring 400 is disposed between the pair of support bars 200, and provides elasticity so that the support bars 200 can rotate around the hinge bar 100 at a predetermined angle.

The separation distance adjusting device 500 is disposed at the hinge bar 100 and includes a cam plate 510 rotating around the hinge bar 100 and a fixing member 520 for pressurizing and fixing the cam plate 510, thereby adjusting a separation distance between the pipe P and the guide frame G.

That is, since the cam plate 510 may be rotated when the fixing member 520 is released, when the fixing member 520 is tightened after the separation distance has been adjusted by rotating the cam plate 510 appropriately, the cam plate 510 is not rotated, but is fixed, thereby enabling the separation distance to be adjusted.

At this time, a typical screw bolt is used as the fixing member 520

The stopper bolt 600 passes through the hinge links 300, and one side thereof pressurizes the guide frame G, thereby enabling elasticity provided by the torsion spring 400 to be adjusted.

The coupling member 700 is configured such that a coupling bolt stably mounted to a through groove provided by passing through the hinge bar 100 is fixed to the guide frame G so that the guide frame support device 10 can be entirely fixed to the guide frame G.

Figure 3:
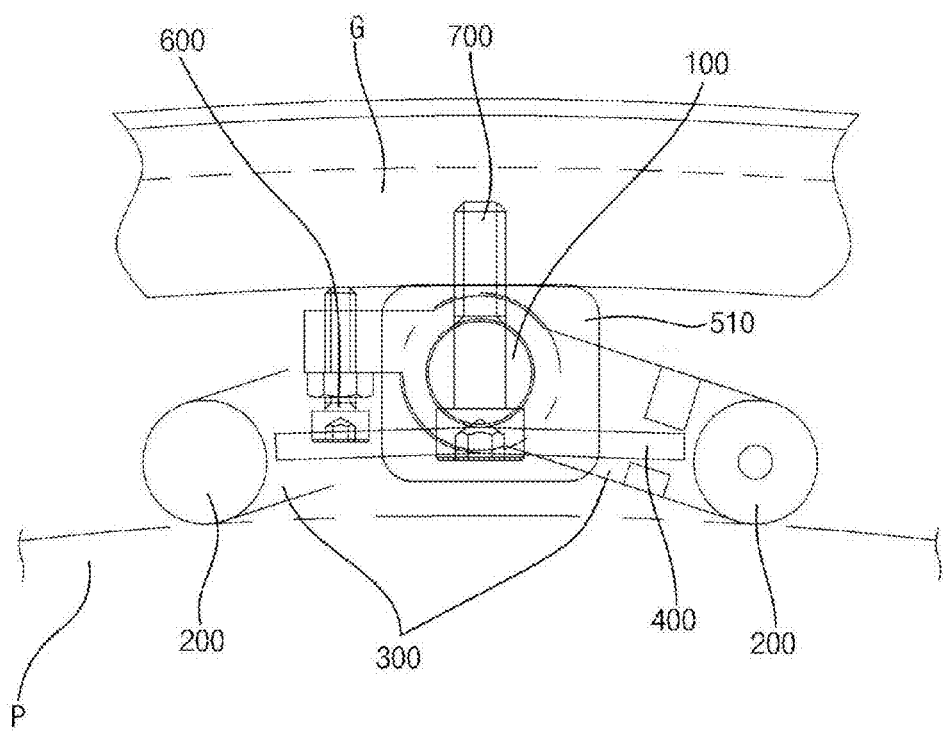
Figure 4:
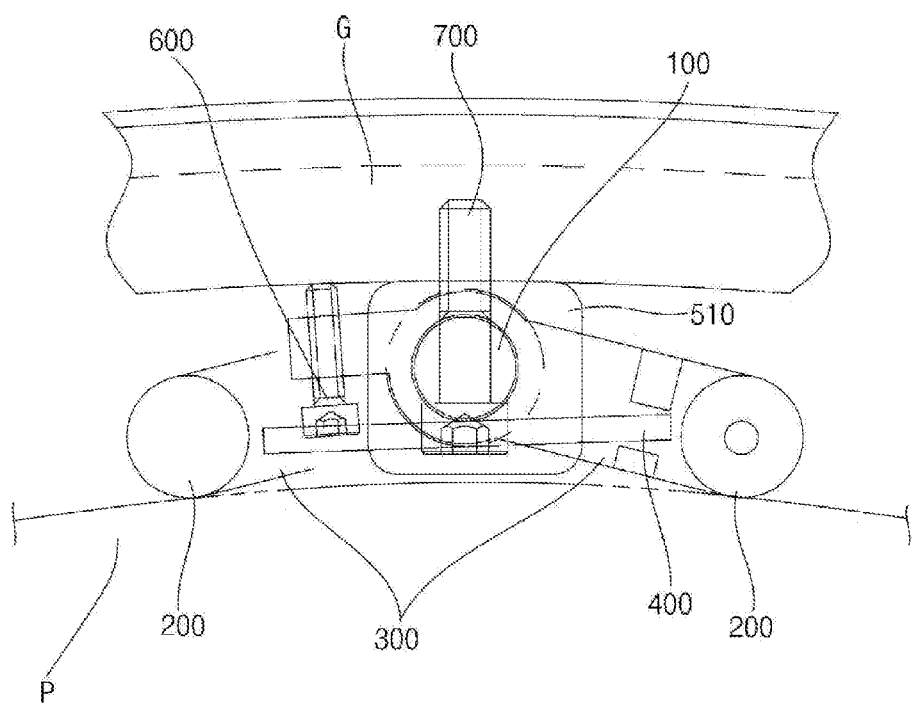
Figure 5:
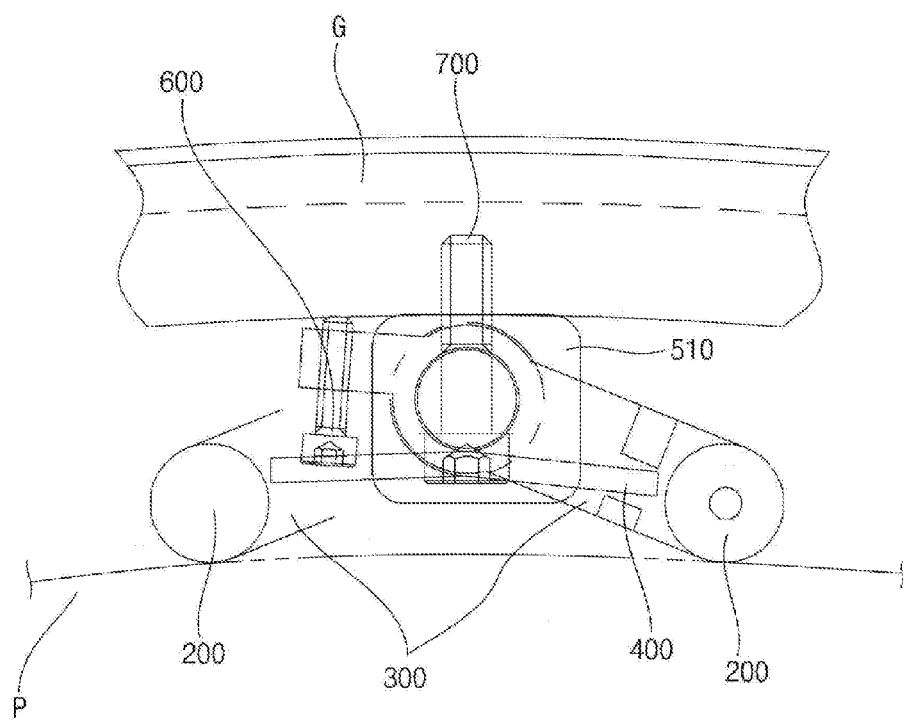

A method of adjusting elasticity of the guide frame support device 10 is the same as illustrated in FIGS. 3, 4, and 5.

The method will be described on the basis of the elasticity of the guide frame support device illustrated in FIG. 3.

First, as illustrated in FIG. 4, when the stopper bolt 600 is tightened, an angle formed by the pair of hinge links 300 is increased compared to that of FIG. 3, and elasticity of the torsion spring 400 is increased.

Meanwhile, as illustrated in FIG. 5, when the stopper bolt 600 is released, the angle formed by the pair of hinge links 300 is reduced compared to that of FIG. 3, and the elasticity of the torsion spring 400 is reduced.

At this time, it can be seen that in the case of FIG. 4, the separation distance between the guide frame G and the pipe P is slight reduced compared to that of FIG. 3, and that in the case of FIG. 5, the separation distance between the guide frame G and the pipe P is slight increased compared to that of FIG. 3. Accordingly, even though the separation distance is slightly changed upon adjustment of the elasticity, this can be corrected by the separation distance adjusting device.

Meanwhile, as illustrated in FIGS. 3 to 6, the cam plate 510 may be formed in a polygonal shape in which distances from the center of rotation to ends are different from each other. In this case, thanks to the different distances from the center of rotation to the ends, the cam plate 510 enables the separation distance to be adjusted even though the stopper bolt 600 or the separation distance adjusting device 500 is used.

Comparing FIGS. 3 and 6, it can be seen that when the quadrangular ends of the camp plate 510 which come into contact with the guide frame G are different from each other, the separation distance is changed.

Meanwhile, in FIGS. 3 to 6, even though only the quadrangular camp plate 510 is illustrated, the cam plate may be formed in a hexagonal shape or in other polygonal shapes having three or more angles, and may have ends in which distances from the center of rotation to the ends are different, and the separation distance may be adjusted in various steps according to the number of polygonal ends. That is, a first embodiment, when the cam plate 510 has a quadrangular shape, the separation distance may be adjusted in four steps. Also, as a second embodiment, when the cam plate 510 have a hexagonal shape, the separation distance can be adjusted in six steps.

The foregoing is illustrative of embodiments and is not to be construed as limiting thereof. Although a few embodiments have been described, those skilled in the art will readily appreciate that many modifications are possible in embodiments without materially departing from the novel teachings and advantages. Accordingly, all such modifications are intended to be included within the scope of this inventive concept as defined in the claims. In the claims, means-plus-function clauses are intended to cover the structures described herein as performing the recited function, and not only structural equivalents but also equivalent structures.

What is claimed is:

1. A welding guide frame support device, the welding guide frame support device, which supports a guide frame provided on an outer circumferential surface of a pipe to be welded, comprising:
   a hinge bar having two ends, wherein the hinge bar is connected to an inner circumferential surface of the guide frame;
   two support bars, wherein each support bar has a first and a second end;
   a plurality of hinge links, a first end of each hinge link is hinge-connected to one of the two ends of the hinge bar and a second end of each hinge link is connected to one of the first and second ends of one of the two support bars; and
   a torsion spring, provided between the two support bars, for providing elastic force to enable the two support bars to rotate around the hinge bar at a predetermined angle.

2. The welding guide frame support device of claim 1, further comprising:
   a cam plate disposed at the hinge bar and rotating around the hinge bar;
   a fixing member for pressurizing and fixing the cam plate; and
   a separation distance adjusting device for adjusting a separation distance between the pipe and the guide frame.

3. The welding guide frame support device of claim 1, further comprising:
   a stopper bolt passing through two of the hinge links, an end of the stopper bolt presses against the guide frame to adjust the elasticity provided by the torsion spring.

4. The welding guide frame support device of claim 2, wherein the cam plate is a polygonal shape having a center of rotation and a plurality of ends, wherein a distance from the center of rotation to a first end of the cam plate is different from the center of rotation to a second end of the cam plate.

* * * * *